United States Patent [19]

Wilson

[11] Patent Number: 4,605,815
[45] Date of Patent: Aug. 12, 1986

[54] FIXED COUNT TERMINAL

[76] Inventor: Ronald L. Wilson, 8970 Par Dr., Douglasville, Ga. 30134

[21] Appl. No.: 637,599

[22] Filed: Aug. 3, 1984

[51] Int. Cl.⁴ .................... H02G 15/113; H02G 7/08
[52] U.S. Cl. .................... 174/41; 24/135 N; 174/59
[58] Field of Search ............ 174/41, 44, 59; 29/857

[56] References Cited

U.S. PATENT DOCUMENTS

| | | | |
|---|---|---|---|
| 1,675,602 | 7/1928 | Faust | 174/41 |
| 1,680,940 | 8/1928 | Emmons | 174/41 X |
| 1,862,811 | 6/1932 | Strong | 174/41 X |
| 1,917,242 | 7/1933 | Emmons | 174/41 X |
| 1,988,174 | 1/1935 | Knudson | 174/41 X |
| 2,021,594 | 11/1935 | Emmons | 174/41 X |
| 2,683,304 | 7/1954 | Channell | 174/41 X |
| 2,891,101 | 6/1959 | Koliss | 174/41 X |
| 3,153,693 | 10/1964 | Baxter et al. | 174/41 X |
| 3,510,825 | 5/1970 | Quackenbush | 174/41 X |
| 3,836,696 | 9/1974 | Gvessitt et al. | 174/41 |
| 3,846,575 | 11/1974 | Troy | 174/41 |
| 3,916,082 | 10/1975 | Gillemot | 174/41 |
| 3,937,550 | 2/1976 | Gillemot | 174/41 X |
| 4,390,744 | 6/1983 | Soffi et al. | 174/41 |
| 4,535,197 | 8/1985 | Butler | 174/41 |

OTHER PUBLICATIONS

Page H-811, Centel Communications Catalog-Apr. 1, 1978.

Primary Examiner—Laramie E. Askin
Attorney, Agent, or Firm—Jones & Askew

[57] ABSTRACT

A fixed count terminal for a sheathed multiconductor cable is provided that includes an elongate terminal shell having a cable port at each end and being formed of two half-shells that are substantially identical, each half-shell having transverse symmetry. A terminal block is affixed to the outside of the shell within an exterior block compartment having fixed count entry ports. Articulated binding straps hingedly unify the half-shells. Strand clamps affixed to the binding straps suspend the terminal from a support strand. Once wire work is complete inside the terminal, it may be closed and adhesively sealed since line drops may be connected to the terminal block outside the shell. Further, by virtue of the transverse symmetry of the half-shells, only one type of half-shell need be provided, a pair of which being sufficient to form a terminal shell.

11 Claims, 7 Drawing Figures

FIXED COUNT TERMINAL

TECHNICAL FIELD

The invention relates to a fixed count terminal for telephone lines or communication cables, and more particularly, to an improved fixed count terminal to be mounted on a communication cable after which connection of service drops may be completed on the outside of the terminal without access to the wirework inside the terminal.

BACKGROUND OF THE INVENTION

Each telephone set must be coupled through a pair of telephone conductors or wires to a telephone central office. Normally, a multiplicity of pairs of insulated telephone conductors are grouped together in an insulated communication cable which is suspended from poles or buried in the ground so that service wires can be coupled to the telephone conductors at various locations remote from the telephone central office. The aerial connection from the distribution cable to an individual building is commonly referred to as the service drop.

This type of multiconductor communication cable normally includes two portions. One portion is an insulated cable containing the individually insulated telephone conductors (sometimes referred to as the cable core) enclosed in an inner metallic shield which is surrounded by an outer insulating sheath. The other portion of the communication cable is a support strand. This strand can have the insulated conductor cable lashed to it by appropriate lashing wire. Alternately, the communication cable can be of the integrated type with the support strand and the insulated conductor cable contained in a continuous common extruded insulating jacket such that the communication cable in cross section is in a figure eight type of configuration with a web of insulating material interconnecting the support strand and the conductor cable.

In order to couple the pairs of telephone wires within the communication cable to a telephone set at a remote location, such as at a house, service or drop wires are used which extend from the cable to the premises where the individual telephone set is located. The connection of the drop wires to the individual pairs of wires within the insulated cable of the communication cable can be accomplished in an aerial type of enclosure which is mounted on or supported by the support strand portion of the communication cable. These types of aerial enclosures have commonly been referred to as ready access closures, or aerial terminals, because they permit a serviceman access to the telephone conductors within the insulated conductor cable when a service drop needs to be connected to the cable and provide a certain amount of protection from the environment for these connections.

In a ready access closure, personnel have access to both the service wires extending into the closure and the conductors contained within the cable core after the jacket, including the outer insulating sheath and the inner metallic shield, has been removed. On the other hand, a fixed count type of terminal is designed so that the exposed cable core is somehow separated from the service wires. As a result, in such terminals a lesser trained installer or the like would not have ready access to the conductors in the communication cable.

When a ready access closure or fixed count terminal is to be mounted on a communication cable, a portion of the outer insulating sheath of the conductor cable must be stripped away and in the case of the integrated cable, the web interconnecting the conductor cable and the support strand must also be severed. In addition, the inner metallic shield of the conductor cable is removed from that portion to the cable such that the individual telephone conductors within the insulated cable are exposed and the connection to the drop wires may be made. Since the outer insulating jacket or sheath and the inner metallic shield are severed for a required distance along the communication cable, the closure or terminal must provide for the continuity of the shield when it is mounted over the exposed area of the communication cable.

Different types of ready access closure or fixed count terminals are disclosed in U.S. Pat. Nos. 3,153,693; 3,499,972; 3,701,835 and 3,846,575. The ready access closures disclosed in these patents have the disadvantage that a relatively unskilled serviceman or telephone installer has direct access to the telephone conductors within the insulated cable portion of the communication cable when service or drop wires are being coupled to the telephone conductors. Such installers may not be as skilled as the linemen or construction worker who installs the cable closure on the communication cable. As a result, the ready access closure can become so overcrowded and unmanageable that the inside of the closure is a "rats nest" of tangled wires and an installer who later needs to make connections in the closure can easily unintentionally disrupt the connection to one or more other previously connected telephone services when making such additional connections. Experience has shown this to be a substantial problem.

Moreover, there is a tendency for personnel to inappropriately tamper with conductors in the cable. For instance, when one pair of conductors is defective, an installer might make the service wire connection to another pair of conductors in the cable which are not supposed to be used in that particular closure, rather than finding the cause of the defect. Also, ready access closures make attractive homes and shelters for animals, particularly birds. Many animals, particularly rodents, will chew the conductors, thus severing them or removing insulation. These circumstances increase the number of faults, and thus maintenance cost to the operating company.

Some of the previously designed fixed count terminals do attempt to isolate the connections of the service wires to the telephone conductors in the communications cable from servicemen or installers by providing a fixed count terminal which is divided into two distinct sections or compartments. One section is for the communication cable and the other section for the service wires. Access to the two sections is through separate covers or doors, so that it is difficult for unauthorized personnel to obtain access to the conductors in the communication cable. This type of fixed count terminal is representatively shown in U.S. Pat. No. 4,390,744 issued June 28, 1983 to Suffi et al. A disadvantage still remains in that the door to the service wire compartment may be left ajar by service personnel thereby permitting moisture to migrate into the cable compartment via numerous penetrations through the wall within the terminal that separates the cable and fixed count compartments, both being internal of the terminal.

Furthermore, prior art fixed count terminals tend to be of rather complex construction, requiring a large number of individually fabricated parts.

SUMMARY OF THE INVENTION

It is an object of the invention to provide a fixed count terminal in which the fixed count compartment is external of the terminal and substantially isolated from the cable compartment within the terminal.

It is another object of the invention to provide for virtually automatic closure of the fixed count compartment following access thereto.

It is another object of the invention to provide a fixed count terminal of enhanced simplicity and economy.

Accordingly, there is provided a fixed count terminal for a sheathed multiconductor cable, which includes an elongate terminal shell having longitudinal cable ports and being formed of two half-shells having substantially identical interior conformations, each half-shell having transverse symmetry and truncated tapered ends; a terminal block affixed to the outside of the shell; a block compartment enclosing said terminal block and having fixed count entry ports; and a hinged binding extending transversely around the shell, the segments of the binding being affixed to the half-shells, respectively.

Advantageously, the fixed count terminal further includes a hinged door on the block compartment, the door being configured to provide external access to the terminal block and being pivotal in a plane substantially normal to the longitudinal axis of the shell. The door is upwardly pivotal to a fully opened position that is marginally geometrically stable relative to the fully closed position of the door with the fixed count terminal in its installed configuration.

Thus, the door will normally stay open while service personnel make connections to the terminal block.

Preferably, the fixed count terminal further includes within the half-shells, compression fit ribs configured to circumferentially engage a cable extending longitudinally within the shell. Preferably, each half-shell includes reciprocal tongue and groove elements along its two interface edges, respectively.

Advantageously, the fixed count entry ports to the block compartment further include outwardly protruding, closed entry grommets, respectively, which are clipped open as required to make service connections, respectively.

To maximize the degree of isolation of the cable wirework within the terminal, the number of penetrations of the shell is preferably not greater than that utilized for affixment of the block to the shell, plus one penetration through which extends a block tail from the interior of the shell to the terminal block.

The fixed count terminal further includes strand engaging clamps for suspending the terminal a selected distance below a support strand. Each clamp includes a pair of vise jaws having a vising mechanism for actuating the jaws; a strand channel across and toward one end of said jaws. The clamps are affixed to the terminal shell bindings, respectively, using their vising mechanisms. The spacing of the channel from the vising mechanism is selected to correspond to a range of heights at which the terminal may be suspended below the strand.

Additionally, there is provided a method for installing a fixed count terminal on a multiconductor cable, which includes the steps of first providing components of a terminal shell including two half-shells, and a terminal block affixed to the outside of one half-shell; then connecting a block tail from the terminal block to the cable, the block tail extending through a penetration in the respective half-shell; then applying adhesive to the interface edges of the half-shells; assembling the half-shells around the cable to form a relatively permanently, adhesively sealed terminal shell; and then connecting a line drop to the terminal block.

BRIEF DESCRIPTION OF DRAWINGS

Further details are given below with reference to the following drawings.

DESCRIPTION OF THE PREFERRED EMBODIMENT

Figure 1:
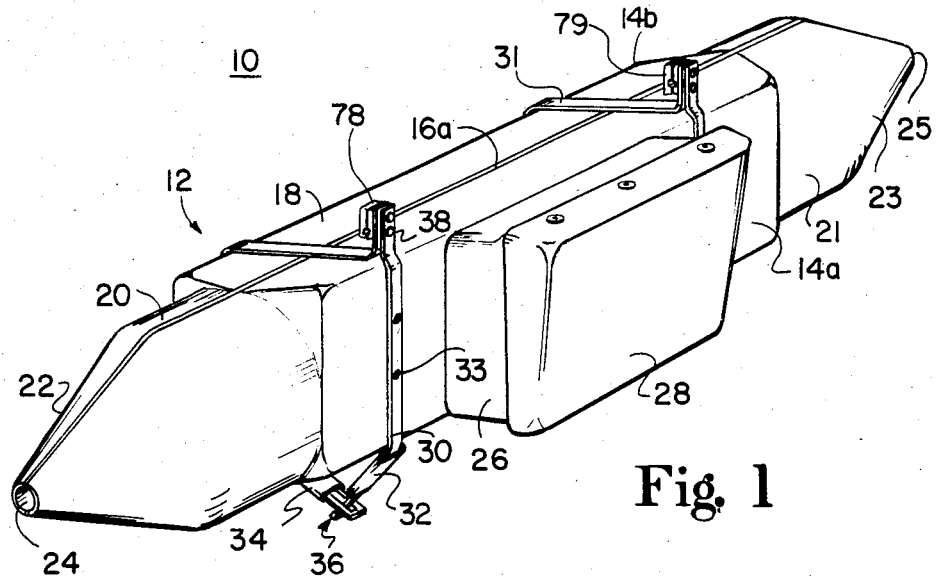
FIG. 1 is a pictorial view of a preferred fixed count terminal according to the invention.

In FIG. 1, there is shown a pictorial view of a preferred fixed count terminal 10 according to the invention. The terminal 10 has a terminal shell 12 which is formed of two substantially identical half-shells 14a, 14b. The terminal shell 12 has a substantially square transverse cross section 18 through its mid portion which extends to circular cross-sectional transition portions 20 and 21, which in turn extend to the tapered end portions 22 and 23 and which are truncated to the cable ports 24 and 25, respectively. The purpose of the tapered ends 22 and 23 of the terminal shell is to provide a convenient way of sizing the cable ports 24 and 25 according to the type cable being utilized, i.e. the truncated, tapered ends may be further trimmed to accommodate cables of increased diameter. Once the tapered ends have been sized to the cable being utilized and following closure of the half-shells on the cable, the cable ports 24 and 25 are tape wrapped. The square cross section of the wirework area permits tight packing of a number of conventional modular splicing connectors which typically are square in cross section.

One half-shell, such as 14a as shown, has affixed to the exterior of its mid portion a terminal block compartment 26 which is accessible through an upwardly pivotal door 28, further discussed below. The half-shells 14a, 14b are held together by the articulated bindings 30 and 31. The binding 30 is comprised of two binding segments 32 and 34 which are hingedly joined at the articulation 36, preferably being a T/slot hinge joint as shown. Further, the binding segments are affixed to their respective half-shells by riveting, as representatively shown at the rivet 33. The binding segments 32 and 34 are secured at the joinder 38, for example by a self-threading screw.

In use, a communication cable is extended longitudinally through the terminal shell 12 via the cable ports 24 and 25 with the relatively expanded mid portion 18 providing a wirework area for connecting the fixed counts to the cable. Initial access to the wirework area is made by laying open the two half-shells 14a, 14b after releasing the binding joinder 38 and pivoting half-shell 14a away from half-shell 14b about the binding articulation 36. Note that the joinder 38 of binding 30 is generally proximate to the upper longitudinal seam 16a between the two half-shells and that articulation 36 is generally proximate to the other longitudinal seam 16b below the terminal shell. This arrangement permits pivotal movement of the half-shell 14a with respect to the half-shell 14b at the articulation 36 upon releasing the joinder 38.

Before beginning wirework, the half-shell 14b is suspended from a support strand just above the terminal installation segment of the communication cable, using semi-support clamps 78 and 79, discussed below in connection with FIG. 7. Then the other half-shell 14a is pivotally joined to the suspended half-shell 14b at the T/slot articulation 36. At this point during installation the terminal is unitarily suspended from the support strand, and wirework may conveniently proceed, followed by final closure. There are no loose parts to grapple with and inadvertently drop.

During installation of the fixed count terminal and once the cable wirework is complete, it is preferred that adhesive be applied to the interface surfaces of the half-shells just prior to their closure so that the wirework area is effectively permanently sealed so that there is no possibility of unauthorized personnel inadvertently disturbing the wirework area. It is emphasized that the block compartment 26 is external of the terminal shell 12 and therefore substantially completely isolated from the cable wirework inside the shell 12.

Figure 2:
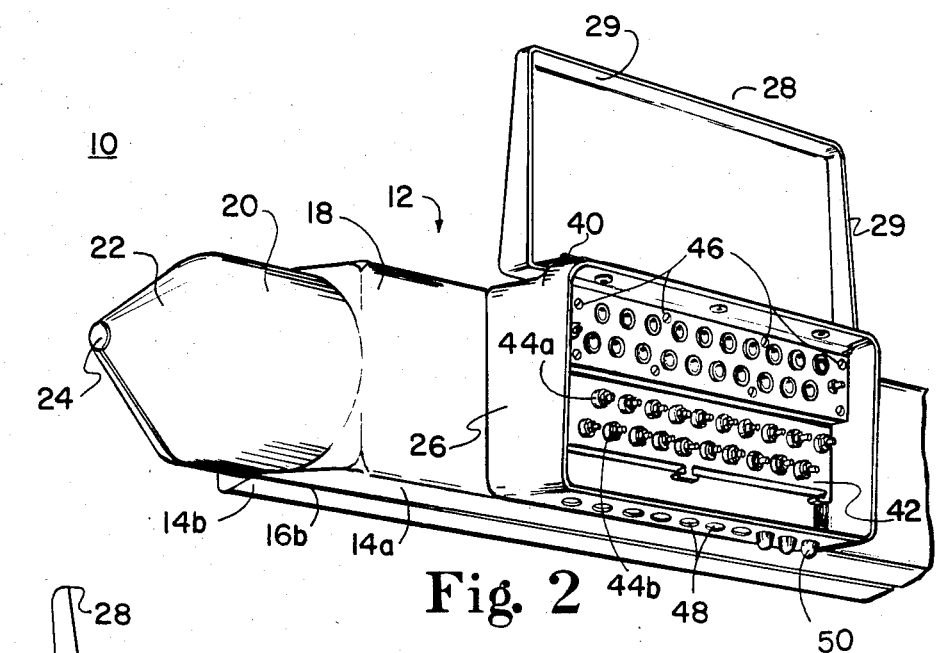
FIG. 2 is similar to FIG. 1 but shows the block compartment of the terminal open.

In FIG. 2, the fixed count terminal 10 is partially shown with its block compartment door 28 open. Inside the block compartment 26, there is a conventional terminal block 42 affixed to the rear wall of the block compartment 26. The block can either be of the fuse protected or unfused type. Representatively, a conventional ten pair protected block is shown. The block 42 has a number of connectors for service wires, representatively pairs of screwdown connectors such as those indicated at 44a, 44b. The block is affixed to the block compartment 26 and the half-shell 14a by conventional means such as by screws 46. The block compartment door 28 is upwardly pivotal and has a peripheral flange 29 to promote weather tightness when closed.

Service wires are brought into the block compartment 26 via entry ports through the base of the clock compartment, as shown by service entry port 48 for example. Entry grommets, such as grommet 50, outwardly protrude from the service entry ports and initially are closed. During installation of a service drop the protruding end of a grommet is clipped and a service wire is inserted through the grommet. Therefore, a service entry port remains closed until installation of the respective service drop. As additional service drops are installed, additional entry grommets are clipped and opened. Further, the entry grommets are sized diametrically such that a relatively snug fit is made with a service wire inserted through the grommet. Preferably, the entry grommets are formed within a rectangular strip of suitable grommet material, such as rubber, the strip being sized to correspond to the base of the block compartment 26. Thus, a complete set of entry grommets may be quickly inserted.

Preferably, when installing service drops, the service wires are routed through the V between the articulated joint of the binding and the terminal shell and then through the entry ports underneath the block compartment.

Figure 3:
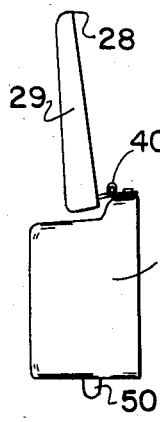
FIG. 3 is an end view of the block compartment of FIG. 2 with its door open.

In FIG. 3, a side view is shown of the block compartment 26 removed from the terminal shell 12. The block compartment door 28 is shown in its open position as was shown in FIG. 2. An entry grommet 50 is shown protruding from the base of the compartment 26. The door 28 is upwardly pivotal at hinge 40. During installation, the fixed count terminal 10 is oriented such that the compartment door 26 is upwardly pivotal to its fully opened position. Further, the hinge 40 is configured such that the door 28 in its fully opened position is only marginally stable relative to its fully closed position. The purpose of this feature relates to virtually semi-automatic closure of the block compartment door 28 upon its being inadvertently lift open by service personnel following access to the block compartment, such as during installation of a service drop. A slight gust of wind will tip the door 28 past vertical which then swings to its fully closed position, as shown in FIG. 1, simply under its own weight. Additionally, any vibration in the cable will tend to close the terminal compartment door. Also, the door may be closed by simply striking it with a pole, or the like, by a person standing on the ground. Edge flanges on the door as mentioned above promote relative weather tightness of the door in its fully closed position. Thus, no latching is required. Further, the block terminal 42 is mounted inside the block compartment 26 somewhat above the base of the compartment, as shown in FIG. 2 so that the connections of the service drops on the block are removed from moisture that might collect temporarily along the base of the block compartment.

Figure 4:
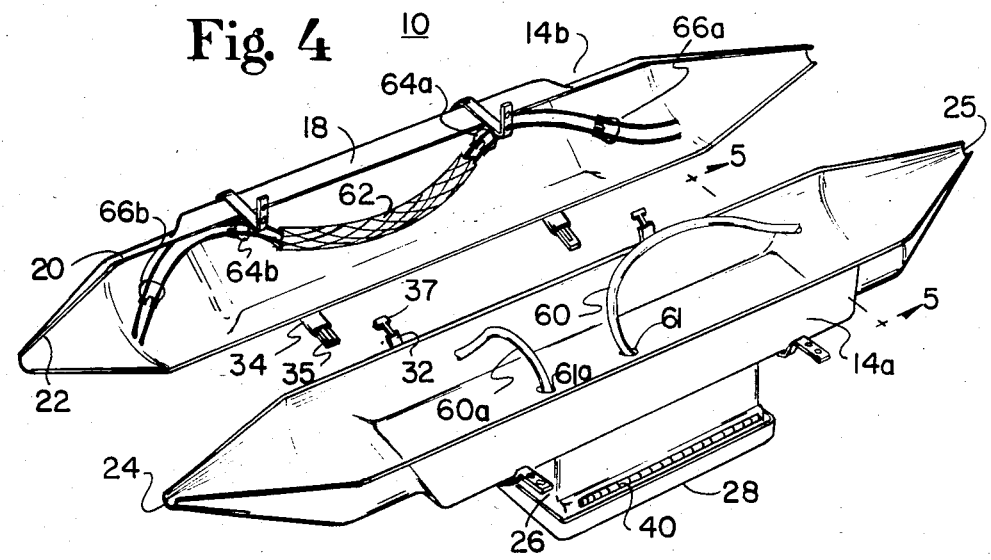
FIG. 4 shows the terminal of FIG. 1 disassembled into its component half-shells.

In FIG. 4, the terminal 10 is shown with its terminal shell disassembled into its component half-shells 14a, 14b. A conventional block tail 60 extends through a penetration 61 in the half-shell 14a from the terminal block within the block compartment 26 to the interior wirework area of the terminal shell. The block tail 60 at its termination in the wirework area is connected into a communications cable in conventional fashion. Optionally, grounding wire 60a is provided when the block is fused. The interior end of the grounding wire 60a is connected, using an eyelet, to a rivet securing one of the binding straps to the shell. Grounding wire 60a is connected into the rear of the block through shell penetration 61a.

Shield continuity must be maintained across the wirework area since shield sheathing has been stripped along the wirework section of the cable. Such continuity is provided by a conventional wire braid 62 which is affixed to the interior of half-shell 14b at clamps 64a, 64b. The leads of the braid 62 are connected to stripped back shield areas on the communications cable where the cable enters and exits the wirework area with conventional clamps 66a, 66b, respectively, using conventional bonding clips.

The disassembled embodiment also shows in greater detail the configuration of the T/slot hinged joint of the binding 30. The binding segment 32 has at its lower end a T-shaped head 37 which is received in a reciprocal slot 35 of the binding segment 34, thereby providing a hinged joint or articulation between the binding segments.

Figure 5:
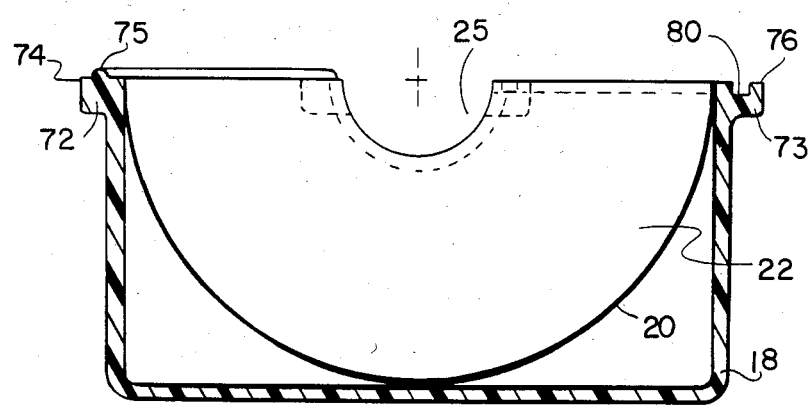
FIG. 5 is a cross sectional view through the mid portion of one of the half shells taken in the direction of line 5—5 in FIG. 4.

In FIG. 5, there is shown a transverse cross section of the half-shell 14a taken in the direction of arrows 5—5 shown in FIG. 4. The half-shell 14a has at its interface edges 74 and 76 sealing flanges 72 and 73, which in turn have reciprocal tongue and groove elements 75 and 80, respectively. The flanged tongue and groove configuration provides for a substantial seal at the seams between the two half-shells when assembled into the terminal shell 12. An especially advantageous feature of the invention concerns the interchangeability of half-shells. It will be noted that only one type of half-shell need be molded, and that by using a pair of identical half-shells, an interlocked shell may be formed by rotating one half-shell endwise so that the tongue and groove elements of one half-shell reciprocally fit the groove and tongue elements of the other half-shell. The half-shells are molded using conventional techniques, of high impact rigid plastic material, such as ABS with UV inhibitors.

Note an essential element of the invention provides that the interior conformation of the half-shells be symmetrical with respect to their elongate axes so that an interlocking pair of these identical half-shells may be interlocked to form a complete terminal shell. It is noted that such an interlocked, adhesively sealed terminal shell may also be effectively used as a buried or aerial cable connector housing a splice along a communications cable. In that situation no block compartment need be provided. However, in applications which require a block, the block compartment size may be easily varied, since the compartment is most preferably a separate component affixed to the terminal shell. Therefore, a multiplicity of terminal types can be made based on the symmetrical half-shell.

It will be noted that there are a relatively small number of penetrations into the wirework area through the walls of the terminal shell 10. The penetration 61 permits passage of the block tail 60. The only other penetrations that are necessary are those utilized for affixment of the terminal block to the sidewall of the half-shell. Further, sealing grommets or washers may be utilized at these penetrations to effectively close off any moisture seepage. Thus, the wirework area of the terminal shell is substantially isolated from the block compartment.

Figure 6:
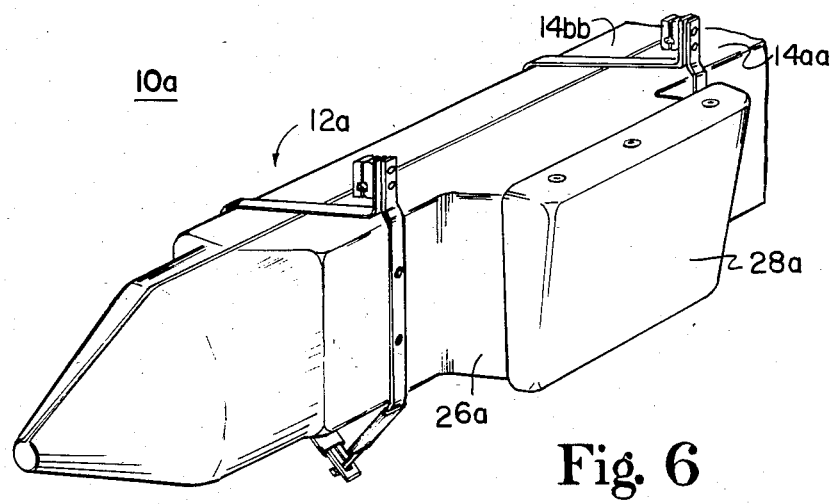
FIG. 6 is similar to FIG. 1 but shows a fixed count terminal having an integral block compartment.

In FIG. 6, an alternative fixed count terminal 10a is shown that is identical to the terminal 10 except that its block compartment 26a having hinged door 28a, is integrally formed with the half-shell 14aa. The terminal compartment 26a is molded as a part of the exterior surface of the half-shell 14aa and does not penetrate the half-shell thereby maintaining isolation of the block compartment from the wirework area within the terminal shell 12a. The half-shell 14bb may be molded identically with the half-shell 14aa, though not preferred, in which case an empty block compartment without a door would extend from the sidewall of the other half-shell 14bb. The advantage of this approach would be that only one type of half-shell need be molded, as discussed above.

Figure 7:
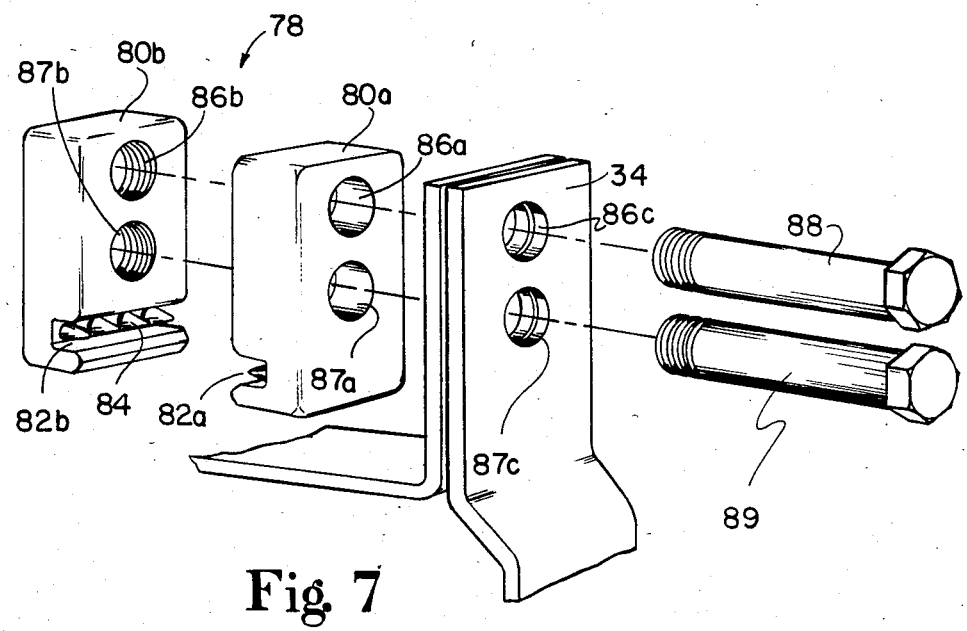
FIG. 7 shows a preferred strand clamp in a fragmented pictorial view for affixing the terminal of FIG. 1 to a support strand.

In FIG. 7, there is shown a detailed exploded view of the strand clamp 78 in proximity to the binding segment 34 at its upper extremity. The strand clamp 78 supports the fixed count terminal from and below a support strand running with and slightly above a suspended communications cable upon which the terminal is installed. The clamp 78 has jaws 80a, 80b with a strand engaging channel of component channels 82a, 82b across the clamping surfaces of the jaws 80a, 80b, respectively. Preferably, serrations 84 are provided inside the strand channel so that the clamp 78 when mounted on a support strand may not be moved on the strand. The serrations are sufficiently deep so as to penetrate any residual plastic on communications cable with a self support strand.

The strand channel is cut toward one end of the jaws, and the jaws are vised together using bolts 88 and 89 which are received into aligned hole sets 86a, 86b, 86c, and 87a, 87b, 87c, respectively. The holes 86a, 87a, 86c and 87c are preferably not threaded while the holes 86b and 87b through the rear jaw of the clamp are threaded. The configuration of the strand clamp 78 provides for adjustment of the distance of the terminal 10 below a support strand. Essentially, a high and low suspension position is provided, with the configuration shown in FIG. 7 providing the high position, i.e. the terminal is relatively close to its support strand. By rotating the jaws 80a, 80b endwise, the strand channel is elevated with respect to the binding segment 34, thereby suspending the terminal farther below the support strand than that obtained with the configuration shown.

Although the present invention has been described in conjunction with preferred embodiments, it is to be understood that modifications and variations may be utilized without departing from the principles and scope of the invention as defined by the following claims.

I claim:

1. A fixed count terminal for a multiconductor cable, comprising:
    an elongate terminal shell having longitudinal cable ports and being formed of two half-shells having substantially identical interior conformations, each half-shell having transverse symmetry and truncated tapered ends;
    a terminal block affixed to the outside of said shell;
    a block compartment enclosing said terminal block and having fixed count entry ports; and
    an articulated binding extending transversely around said shell, the articulated segments of said binding being affixed to said half-shells, respectively.

2. The fixed count terminal of claim 1 further comprising a hinged door on said block compartment, said door being configured to provide external access to said terminal block and being pivotal in a plane substantially normal to the longitudinal axis of said shell, further provided that said door is upwardly pivotal to a fully opened position that is marginally geometrically stable relative to the fully closed position of said door with said fixed count terminal in its installed configuration.

3. The fixed count terminal of claim 1 wherein the articulation in said binding is proximate to one seam between said half-shells, and the joinder of said binding around said shell is proximate to the other seam between said half-shells.

4. The fixed count terminal of claim 3 wherein said articulation in said binding comprises a T/slot hinge joint.

5. The fixed count terminal of claim 1 wherein each said half-shell comprises reciprocal tongue and groove elements along its two interface edges, respectively.

6. The fixed count terminal of claim 1 wherein said block compartment is integral to the exterior of one of said half-shells.

7. The fixed count terminal of claim 1 wherein said fixed count entry ports further comprise outwardly protruding, closed entry grommets, respectively.

8. The fixed count terminal of claim 1 wherein said half-shells are substantially identical.

9. The fixed count terminal of claim 1 wherein said terminal shell comprises a substantially square cross-section across its mid portion and a substantially circular cross-section across each of its end portions.

10. The fixed count terminal of claim 1 further provided that said shell has a number of penetrations not greater than that utilized for affixment of said block to said shell, plus one through which extends a block tail from the interior of said terminal shell to said terminal block.

11. The fixed count terminal of claim 1 further comprising strand engaging means for suspending said terminal a selected distance below a support strand.

* * * * *